United States Patent
Shetty et al.

(10) Patent No.: US 8,107,988 B1
(45) Date of Patent: Jan. 31, 2012

(54) CONDUCTING POWER CONTROL BASED ON REVERSE-LINK RF CONDITIONS

(75) Inventors: Manoj Shetty, Overland Park, KS (US); Sachin R. Vargantwar, Overland Park, KS (US); Siddharth S. Oroskar, Overland Park, KS (US); Kamal Doshi, Farmington, CT (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 791 days.

(21) Appl. No.: 12/179,744

(22) Filed: Jul. 25, 2008

(51) Int. Cl.
*H04B 7/00* (2006.01)

(52) U.S. Cl. .... 455/522; 455/127.1; 455/69; 455/67.11; 370/318; 370/332

(58) Field of Classification Search .............. 455/418, 455/452.1, 446, 67.13, 453, 456.5, 450, 522, 455/69, 67.11; 370/230, 335, 342, 317, 441, 370/395.2, 479, 332, 333, 320, 470, 235, 370/231
See application file for complete search history.

(56) References Cited

U.S. PATENT DOCUMENTS

| | | | |
|---|---|---|---|
| 5,475,861 A | 12/1995 | Hall | |
| 5,914,950 A | 6/1999 | Tiedemann, Jr. et al. | |
| 6,154,638 A | 11/2000 | Cheng et al. | |
| 6,397,043 B1 | 5/2002 | Kang | |
| 6,597,923 B1 | 7/2003 | Vanghi et al. | |
| 6,671,512 B2 | 12/2003 | Laakso | |
| 6,757,537 B1 | 6/2004 | Choi et al. | |
| 6,944,449 B1 | 9/2005 | Gandhi et al. | |
| 7,054,275 B2 | 5/2006 | Kim et al. | |
| 7,072,630 B2 | 7/2006 | Lott et al. | |
| 7,194,281 B2 | 3/2007 | Peng et al. | |
| 7,215,653 B2 | 5/2007 | Kim et al. | |
| 7,280,510 B2 | 10/2007 | Lohtia et al. | |
| 7,280,511 B2 | 10/2007 | Ahn | |
| 7,315,573 B2 | 1/2008 | Lusky et al. | |
| 7,392,055 B2 | 6/2008 | Li et al. | |

(Continued)

FOREIGN PATENT DOCUMENTS

KR 20040099837 12/2004

OTHER PUBLICATIONS

Non-final Office Action from U.S. Appl. No. 11/558,337, mailed Dec. 16, 2009.

(Continued)

*Primary Examiner* — Sujatha Sharma

(57) ABSTRACT

Methods and systems are provided for conducting power control based on reverse-link RF conditions. In an embodiment, a base station periodically calculates a reverse noise rise (RNR), periodically calculates a collective reverse-link frame error rate (RFER), and periodically checks whether a new call-origination message has been received. If a call origination has not been received, the base station checks whether the RNR is less than a threshold. If the RNR is less than the threshold, the base station sends power-up commands to each of mobile stations. If the RNR is not less than the threshold, the base station sends power-down commands to each of the mobile stations so long as the collective RFER is less than a maximum RFER. If a call origination has been received, the base station sends power-down commands to each of the mobile stations until the collective RFER reaches the maximum RFER.

20 Claims, 3 Drawing Sheets

U.S. PATENT DOCUMENTS

| | | | |
|---|---|---|---|
| 7,403,800 | B2 | 7/2008 | Han et al. |
| 7,466,682 | B1 * | 12/2008 | Ribas et al. ............ 370/342 |
| 7,522,919 | B2 | 4/2009 | Yoon et al. |
| 7,609,635 | B2 | 10/2009 | Bae et al. |
| 7,668,561 | B2 | 2/2010 | Au et al. |
| 7,693,032 | B2 | 4/2010 | Li et al. |
| 7,813,323 | B1 | 10/2010 | Talley et al. |
| 7,852,810 | B1 | 12/2010 | Talley et al. |
| 2001/0019943 | A1 | 9/2001 | Bender et al. |
| 2002/0094837 | A1 | 7/2002 | Hamabe et al. |
| 2003/0064741 | A1 | 4/2003 | Silva et al. |
| 2003/0086405 | A1 | 5/2003 | Silva et al. |
| 2003/0134656 | A1 | 7/2003 | Chang et al. |
| 2003/0143190 | A1 | 7/2003 | Iyer et al. |
| 2003/0153272 | A1 | 8/2003 | Takano |
| 2003/0206537 | A1 | 11/2003 | Choi et al. |
| 2003/0231586 | A1 * | 12/2003 | Chheda ............ 370/230 |
| 2004/0047305 | A1 | 3/2004 | Ulupinar |
| 2004/0146016 | A1 | 7/2004 | Kim et al. |
| 2004/0176042 | A1 | 9/2004 | Lott et al. |
| 2004/0193971 | A1 | 9/2004 | Soong et al. |
| 2004/0213182 | A1 | 10/2004 | Huh et al. |
| 2004/0241803 | A1 | 12/2004 | Rosen et al. |
| 2005/0041612 | A1 | 2/2005 | Zhang et al. |
| 2005/0107107 | A1 | 5/2005 | Shahidi |
| 2005/0197080 | A1 | 9/2005 | Ulupinar et al. |
| 2005/0201332 | A1 | 9/2005 | Bakshi et al. |
| 2005/0233693 | A1 | 10/2005 | Karaoguz et al. |
| 2005/0288053 | A1 | 12/2005 | Gu |
| 2006/0045045 | A1 | 3/2006 | Blessent et al. |
| 2006/0223444 | A1 | 10/2006 | Gross et al. |
| 2006/0223565 | A1 | 10/2006 | Gandhi et al. |
| 2006/0234638 | A1 | 10/2006 | Mueckenheim et al. |
| 2006/0275782 | A1 | 12/2006 | Gunderson et al. |
| 2007/0026884 | A1 | 2/2007 | Rao |
| 2007/0129086 | A1 | 6/2007 | Toone |
| 2007/0155395 | A1 | 7/2007 | Gopalakrishnan et al. |
| 2007/0191044 | A1 | 8/2007 | Kostic et al. |
| 2007/0270100 | A1 | 11/2007 | Agrawal et al. |
| 2008/0084841 | A1 | 4/2008 | Kim et al. |
| 2008/0137604 | A1 | 6/2008 | Lee |
| 2010/0178907 | A1 * | 7/2010 | Oroskar et al. ............ 455/418 |

OTHER PUBLICATIONS

Unpublished U.S. Appl. No. 12/026,236, entitled "Dynamic Adjustment of Target Frame Error Rate," filed Feb. 5, 2008 in the name of Manghat et al.

Non-final Office Action from U.S. Appl. No. 11/762,534, mailed Feb. 4, 2010.

Non-final Office Action from U.S. Appl. No. 11/619,348, mailed Mar. 25, 2010.

Unpublished U.S. Appl. No. 12/763,203, filed Apr. 19, 2010 in the name of Goyal et al., entitled "Selectively Conducting Reverse-Link Power Control and Call Admission Control."

Unpublished U.S. Appl. No. 12/763,206, filed Apr. 19, 2010 in the name of Khanka et al., entitled "Identifying and Selectively Controlling Reverse-Noise Contribution on a Per-Access-Terminal Basis."

Unpublished U.S. Appl. No. 11/762,534, entitled "Dynamic Adjustment of Reverse-Link Frame-Error-Rate (RFER) Target Based on Reversed-Link RF Conditions," filed Jun. 13, 2007 in the name of Talley et al.

Non-final Office Action from U.S. Appl. No. 11/619,348, mailed May 26, 2009.

Non-final Office Action from U.S. Appl. No. 10/910,835, mailed Nov. 19, 2007.

Final Office Action from U.S. Appl. No. 10/910,835, mailed Jun. 13, 2008.

Advisory Action from U.S. Appl. No. 10/910,835, mailed Aug. 19, 2008.

Hye Jeong Lee, "New Rate Control Scheme Based on Adaptive rateLimit for 1xEV-DO Reverse Link Traffic Channels Communications Letters," vol. 9, No. 10, Oct. 2005.

Woo Young Yeo, "An Analytical Model for Reverse Link Rate Control in cdma2000 1xEV-DO Systems," IEEE Communications Letters, vol. 9, No. 3, Mar. 2005.

Esa Tiirola, "Performance of a UMTS Uplink MIMO Scheme," IEEEplore 2003.

Ridha Nasri, "Achieving a high uplink capacity and coverage by using multicariers in 3G-WCDMA Systems," 2004 IEEE.

Non-final Office Action from U.S. Appl. No. 11/558,337, mailed May 29, 2009.

Unpublished U.S. Appl. No. 10/910,835, entitled "Dynamic Power Rail Configuration in a Wireless CDMA Communication System," filed Aug. 4, 2004 in the name of Ribas et al.

Final Office Action from U.S. Appl. No. 11/619,348, mailed Oct. 29, 2009.

Final Office Action from U.S. Appl. No. 11/558,337 mailed Jun. 1, 2010.

Notice of Allowance from U.S. Appl. No. 11/762,534 mailed Jun. 3, 2010.

Unpublished U.S. Appl. No. 11/558,337, entitled "Dynamic Adjustment of EV-DO Reverse-Link Transitional Probabilities," filed Nov. 9, 2006 in the name of inventor Andrew M. Wurtenberger et al.

Unpublished U.S. Appl. No. 11/619,348, entitled "Dynamic Adjustment of Forward-Link Frame-Error-Rate (FFER) Target," filed Jan. 3, 2007 in the name of inventor Ryan S. Talley et al.

Non-Final Office Action from U.S. Appl. No. 12/026,236 mailed Feb. 2, 2011.

Final Office Action from U.S. Appl. No. 12/026,236 mailed Jun. 22, 2011.

* cited by examiner

CONDUCTING POWER CONTROL BASED ON REVERSE-LINK RF CONDITIONS

BACKGROUND

1. Technical Field

The present invention relates to wireless networks, and, more particularly, to managing transmission power between mobile stations and base stations.

2. Description of Related Art a. CDMA Networks Generally

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." These networks typically provide communication services such as voice, Short Message Service (SMS) messaging, and packet-data communication.

Typical CDMA networks include a plurality of base stations, each of which provide one or more wireless coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access. The base station and the mobile station conduct these communications over a frequency known as a carrier, which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a wireless coverage area, base stations may provide service in a given sector on one carrier, or on more than one. An instance of a particular carrier in a particular sector is referred to herein as a sector/carrier. In a typical CDMA system, using a configuration known as radio configuration 3 (RC3), a base station can, on a given sector/carrier, transmit forward-link data on a maximum of 64 distinct channels at any given time, each channel corresponding to a unique 64-bit code known as a Walsh code. Of these channels, typically, 61 of them are available as traffic channels (for user data), while the other 3 are reserved for administrative channels known as the pilot, paging, and sync channels.

When a base station instructs a mobile station—operating on a particular sector/carrier—to use a particular traffic channel for a communication session, such as a voice call or a data session, the base station does so by instructing the mobile station to tune to a particular one of the 61 Walsh-coded traffic channels on that sector/carrier. It is over that assigned traffic channel that the base station will transmit forward-link data to the mobile station during the ensuing communication session. And, in addition to that Walsh-coded forward-link channel, the traffic channel also includes a corresponding Walsh-coded reverse-link channel, over which the mobile station transmits data to the base station.

b. Reverse-Link Transmission-Power Management i. The Power Control Bit (PCB) and the Ratio $E_b/N_t$

In CDMA networks, the transmitting power of a mobile station on the reverse link of a traffic channel at any given moment is based on a number of factors, two of which are known as the power control bit (PCB) and the ratio $E_b/N_t$. The PCB is a bit (0 or 1) that the base station sends to the mobile station on the forward link at a high frequency, on the order of 800 times per second (i.e. once every 1.25 milliseconds (ms)). The mobile station repeatedly responsively adjusts its transmission power to the base station on the reverse link. Typically, if the base station sends a 0, the mobile station will decrease the power by a set decrement, such as 1 dB, whereas, if the base station sends a 1, the mobile station will increase the power by a set increment, which may also be 1 dB. Thus, using these numbers, the mobile station's reverse-link transmission power would change by plus or minus 1 dB every 1.25 ms.

Each such 1.25-ms cycle, a typical base station determines whether to transmit a PCB equal to 0 or 1 to a given mobile station by comparing (i) a signal-to-noise ratio that the base station computes for that mobile station with (ii) a stored threshold value for that signal-to-noise ratio that the base station maintains on a per-mobile-station basis. This ratio is generally known and referred to herein as $E_b/N_t$, while the threshold is referred to herein as the $E_b/N_t$ threshold. $E_b/N_t$ compares the strength at which the base station is receiving the reverse-link signal from the mobile station ($E_b$ for "energy per bit") with the strength at which the base station is receiving signals from all other sources on the frequency of the sector/carrier on which that mobile station is operating ($N_t$ for "noise"). $E_b/N_t$, then, is a signal-to-noise ratio for the reverse-link part of the traffic channel. As stated, the base station typically computes $E_b/N_t$ at the same frequency at which it transmits the PCB, which again may be once every 1.25 ms.

Thus, in typical operation, for a given mobile station (and in fact for each mobile station that the base station is serving), every 1.25 ms, the base station compares the most recent computation of $E_b/N_t$ for that mobile station with the $E_b/N_t$ threshold for that mobile station. If $E_b/N_t$ exceeds the threshold, then the base station is receiving a strong enough signal from the mobile station, and thus it transmits a PCB of 0, causing the mobile station to reduce its reverse-link transmission power. If, on the other hand, the computed $E_b/N_t$ is less than the threshold, the base station is not receiving a strong enough signal, and thus it transmits a PCB of 1, causing the mobile station to increase its reverse-link power. Thus, the reverse-link power on the traffic channel typically stabilizes to a point that achieves an $E_b/N_t$ value (as measured at the base station) that is near the $E_b/N_t$ threshold. And this threshold can be changed during operation.

ii. Reverse-Link Frame Error Rate (RFER)

In CDMA networks, data is transmitted from the mobile station to the base station (and vice versa) in data units known as frames, which typically last 20 ms. Some frames received by the base station contain errors as a result of imperfect transfer from the mobile station, while some do not. The reverse-link frame error rate (RFER) is a ratio, computed on a per-mobile-station basis by the base station, of the number of error-containing frames that the base station receives from a given mobile station to the total number of frames that the base station receives from the given mobile station, over a given time period. Note that the RFER often also takes into account frames that are not received at all by the base station. And other things being more or less equal, the more power the mobile station uses to transmit to the base station, the lower the mobile station's RFER will be.

More particularly, at approximately the same frequency at which the base station is receiving reverse-link frames (i.e. once every 20 ms) from a given mobile station, the base station computes a RFER for that mobile station over some previous number of frames, which may be 20, 100, 200, or some other number. Thus, the base station essentially computes a RFER for some rolling window of previous frames. And each time the base station computes the RFER for that mobile station, the base station compares that computed value with a threshold: a sector/carrier-level parameter often referred to as the "RFER target," which may be around 2%.

If the RFER for that mobile station exceeds the RFER target for the sector/carrier, the base station is receiving too many error-containing frames and/or missing too many frames from that mobile station, and thus the base station will responsively increase its $E_b/N_t$ threshold related to that mobile station. In the short term, this will result in the base station's computed $E_b/N_t$ for that mobile station falling below the increased threshold, which in turn will result in the base station repeatedly sending PCBs equal to 1 to the mobile station. This, in turn, will result in the mobile station increasing its reverse-link transmission power, which will then typically stabilize at a level that will result in the base station computing an $E_b/N_t$ for that mobile station that is close to the new, increased $E_b/N_t$ threshold that the base station is maintaining for that mobile station, and perhaps result in an acceptable RFER for that mobile station.

If, on the other hand, the RFER falls below the RFER target, the mobile station may be using excessive power for transmitting on the reverse-link—in essence, the base station may be receiving a signal from that mobile station that may be considered too strong, perhaps at the expense of that mobile station's battery life, and perhaps creating excessive noise from a single mobile station on the sector/carrier. If that situation holds for a specified period of time, the base station may decrease the $E_b/N_t$ threshold that the base station is maintaining for that mobile station, resulting in the base station's computed $E_b/N_t$ repeatedly exceeding the decreased threshold. This, in turn, will result in the base station repeatedly sending PCBs equal to 0 to the mobile station, which will result in the mobile station decreasing its reverse-link transmission power, which will then typically stabilize at a level that will result in the base station computing an $E_b/N_t$ that is very close to the new, decreased $E_b/N_t$ threshold.

Thus, the base station's repeated RFER calculation for the mobile station and comparison with the RFER target for the sector/carrier causes the base station to iteratively adjust its $E_b/N_t$ threshold corresponding to the mobile station. In turn, the base station's even-more-frequent calculation of $E_b/N_t$ and comparison with its current $E_b/N_t$ threshold for the mobile station causes the base station to iteratively send PCBs of 0 (for less power) or 1 (for more power) to the mobile station, which then causes the mobile station to adjust its reverse-link transmission power on the traffic channel. This entire back-and-forth calibration process is conducted in an attempt to keep the RFER calculated by the base station and associated with the mobile station at or below what is deemed to be an acceptable threshold, which again may be around 2%.

Note that different situations may present themselves on a given sector/carrier at different times. For one, the number of mobile stations using traffic channels can vary between just a few, such as 10, to a larger number, such as 30, and perhaps approach the upper bound of 61 (assuming RC3). And, as stated, the power that the mobile stations use for transmission to the base station can vary. In particular, variables such as terrain, weather, buildings, other mobile stations, other interference, and distance from the base station can affect the RFER that the base station experiences for a given mobile station, and thus the amount of power the mobile station uses on the reverse link. Using too much power can drain battery life, and it may sometimes be the case that a mobile station reaches its maximum transmission power and still cannot achieve an acceptable RFER, in which case it may not be able to communicate with the base station.

Note that, in some implementations, a ratio other than $E_b/N_t$ may be used. In particular, each mobile station, when operating on a traffic channel, may also transmit on the reverse-link on what is known as a reverse pilot channel. The base station may then compute a ratio known as $E_c/I_o$ for that mobile station, which would be a ratio comparing (a) the power level at which the base station is receiving the reverse pilot channel ("$E_c$" for "energy per chip") and (b) the power level at which the base station is receiving all transmissions ("$I_o$") on the frequency (sector/carrier) on which the mobile station is operating (including the reverse pilot channel).

The base station would then operate with respect to $E_c/I_o$ as described above with respect to $E_b/N_t$. That is, the base station would maintain an $E_c/I_o$ threshold for each mobile station, and repeatedly compare the measured $E_c/I_o$ with the $E_c/I_o$ threshold, and send PCBs equal to 0 or 1, causing the mobile station to either decrease or increase its reverse-link transmission power. The base station would also adjust the $E_c/I_o$ threshold as described above with respect to the $E_b/N_t$ threshold, in an effort to keep each mobile station at or just below the RFER target.

iii. Reverse Noise Rise (RNR)

As stated, in general, interference can be—and often is—present on the reverse link of a given sector/carrier. That is, on the given sector/carrier, a base station will receive transmissions not only from mobile stations that are operating on that sector/carrier, but will also often receive transmissions on that frequency from other mobile stations, other transmitting devices, and/or any other sources of interference on that frequency in that area. At a given moment, the sum total of what a base station is receiving on a given sector/carrier (i.e. a given frequency)—including transmissions from mobile stations operating on that sector/carrier, as well as from all other sources—is known as the "reverse noise" on that sector/carrier.

Quite frequently (e.g., once per frame (i.e. once every 20 ms)), base stations compute a value known as "reverse noise rise" (RNR) for a given sector/carrier, which is the difference between (i) the reverse noise that the base station is currently detecting on the sector/carrier and (ii) a baseline level of reverse noise for the sector/carrier. Thus, the base station computes how far the reverse noise has risen above that baseline.

For the baseline level, CDMA networks may use a value such as the lowest measurement of reverse noise on the sector/carrier in the previous 24 hours, or perhaps an average of the 24-hour lows over the previous week, or some other value. Incidentally, some networks, including Evolution Data Optimized (EV-DO) networks, may periodically use what is known as a silent interval, which is a coordinated time period during which mobile stations know not to transmit anything to the base station. The base station can then measure whatever else is out there. In that case, the baseline level would correspond to the amount of reverse noise when the sector/carrier is unloaded. And other reverse-link-noise levels could be used as a baseline.

Other things being more or less equal, the lower the RNR is at a given moment, the more favorable the RF environment is for communication between mobile stations and the base station at that time. Correspondingly, the higher the RNR, the less favorable the RF environment is. Also, a low RNR generally corresponds to a sector/carrier being lightly loaded, in other words that is supporting communications for a relatively low number of mobile stations. A high RNR, as one might expect, generally corresponds to a sector/carrier being heavily loaded, in other words that is supporting communications for a relatively high number of mobile stations.

SUMMARY

Methods and systems are provided for conducting power control based on reverse-link RF conditions. In an embodiment, a base station carries out a method of providing service to mobile stations on a carrier in a wireless coverage area. The method comprises the base station periodically calculating a reverse noise rise (RNR), periodically calculating a collective reverse-link frame error rate (RFER) for the mobile stations, and periodically checking whether a new call-origination message has been received.

If a new call-origination message has not been received, the base station checks whether the calculated RNR is less than an RNR threshold. If the calculated RNR is less than the RNR threshold, the base station sends one or more power-up commands to each of mobile stations, wherein a power-up command instructs a mobile station to incrementally increase reverse-link transmission power. If, on the other hand, the calculated RNR is not less than the RNR threshold, the base station sends one or more power-down commands to each of the mobile stations so long as the collective RFER is less than a maximum RFER, wherein a power-down command instructs a mobile station to incrementally decrease reverse-link transmission power.

If, however, a new call-origination message has been received, the base station sends a series of one or more power-down commands to each of the mobile stations until the collective RFER reaches the maximum RFER.

These as well as other aspects and advantages will become apparent to those of ordinary skill in the art by reading the following detailed description with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
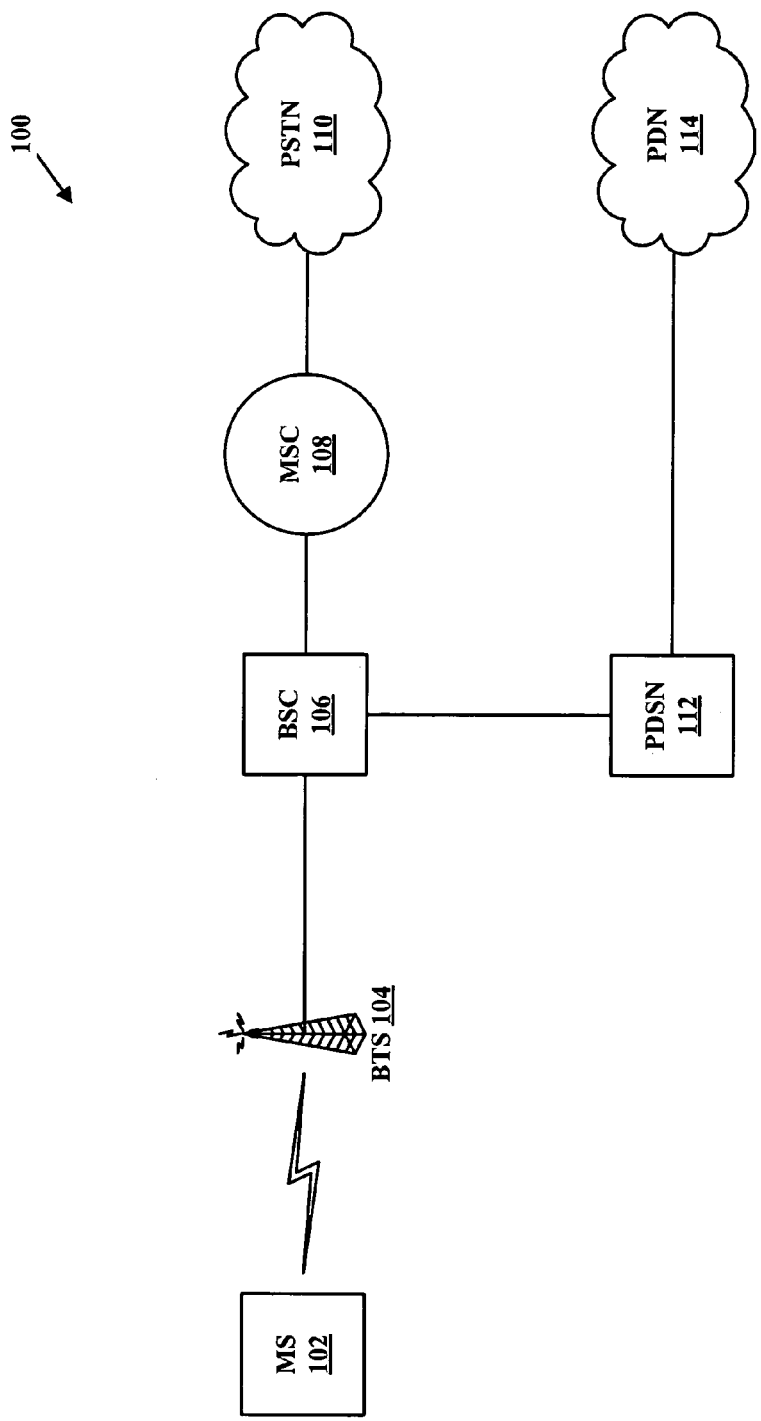
FIG. 1 is a simplified block diagram of a communication system, in accordance with exemplary embodiments.

As presently contemplated, in exemplary embodiments, a base station, with respect to a given sector/carrier, dynamically adjusts the reverse-link transmission power of the mobile stations on the sector/carrier in response to periodic calculations of RNR on the sector/carrier, periodic calculations of a collective RFER of the mobile stations on the sector/carrier, and periodic checking for call-origination messages. The collective RFER is essentially an average of the individual RFERs of the mobile stations on the sector/carrier.

Another way to view the collective RFER is as a sector/carrier-wide calculation of error-containing or missing frames as compared with all frames that should have been received over some time period.

Thus, if the base station determines that a new call-origination message has not been received, the base station compares the calculated RNR with an RNR threshold. If the calculated RNR is less than the RNR threshold, the base station sends one or more power-up commands (e.g. PCBs equal to 1) to each of the mobile stations, instructing them to incrementally increase their reverse-link transmission power, which will advantageously reduce the mobile stations' individual RFERs and improve call quality, making use of available RNR capacity on the sector/carrier. If, however, the calculated RNR is not less that the RNR threshold, the base station sends one or more power-down commands (e.g. PCBs equal to 0) to each of the mobile stations, instructing them to incrementally decrease their reverse-link transmission power, so long as the collective RFER remains less than a maximum-RFER value, which will reduce the RNR on the sector/carrier, though perhaps increasing the mobile stations' individual RFERs and causing a decrease in call quality.

If, on the other hand, the base station determines that a new call-origination message has been received, the base station sends a series of one or more power-down commands to each of the mobile stations until the collective RFER reaches that maximum-RFER value. This will cause the mobile stations on a sector/carrier-wide basis to power down their reverse-link transmission power so that new call-origination messages will not be blocked by the base station. As one example, if new call-origination messages would likely be blocked at an RNR of 6 dB, the RNR threshold may be set to approximately 5.5 dB.

Thus, unlike prior-art approaches of maintaining a RFER on a mobile-station-by-mobile-station basis, and thus conducting reverse-link power control on a mobile-station-by-mobile-station basis, the present methods and systems involve conducting reverse-link power control on a sector/carrier-wide basis, both in terms of measuring current status and in terms of commanding mobile stations to power up or power down.

Note that, in general, with respect to comparing values with thresholds, it should be noted that mathematical comparison language such as "less than" and "not less than" could be restated or reframed in terms such as "less than" and "greater than or equal to," or perhaps the implementation could be "less than or equal to" and "greater than," and so on, without departing from the scope and spirit of the invention.

Note as well that the base station may calculate the RNR, calculate the collective RFER, and check for new call-origination messages according to different definitions of "periodically," i.e. according to different periods. For example, the RNR could be calculated once per frame as described above, while the collective RFER could be calculated at those same times and/or possibly also more frequently. For example, the base station may monitor (i.e. repeatedly calculate) the collective RFER when repeatedly sending power-down commands, so as to monitor whether the collective RFER is still less than—or has reached—the maximum RFER. And the base station may check for new call-origination messages according to any suitable periodicity, and may also implement a software and/or hardware-interrupt strategy for checking for—and detecting—new call-origination messages.

As explained, a relatively low RNR may correspond to a sector/carrier being lightly loaded with mobile stations, while a relatively high RNR may correspond to a sector/carrier being heavily loaded with mobile stations. Thus, one way to characterize the present invention is that the reverse-link power control of mobile stations on a sector/carrier is being made dynamically responsive to loading conditions. And metrics of sector/carrier load other than RNR can be used—alone or in combination with RNR or each other—to dynamically implement this power control. Some load-metric candidates include Walsh-code occupancy (i.e. number of Walsh codes in use compared with total number of Walsh codes) and paging-channel-timeslot occupancy (i.e. number of paging-channel timeslots in use compared with total number of paging-channel timeslots), any other load metrics, and any combination of these. Using RNR is preferred, however, since it, RFER, and the power-up and power-down commands (e.g. PCBs) are related to reverse-link transmission power.

As also explained, a relatively low RNR could correspond to favorable RF conditions on a sector/carrier, while a relatively high RNR could correspond to unfavorable RF conditions. As such, another way to characterize the present invention is that the reverse-link power control of mobile stations on a sector/carrier is being made dynamically responsive to reverse-link RF conditions. And the loading-conditions and reverse-link-RF-conditions views are not mutually exclusive. That is, RNR generally reflects some of each, and each can certainly contribute to situations where it would be advantageous to adjust a power-control strategy accordingly.

Moreover, while embodiments of the invention are described herein for the most part with respect to a single base station and, more particularly, with respect to a single sector/carrier, this mode of explanation is for clarity and not by way of limitation. Thus, the present invention could be implemented in all or any subset of the base stations of a given wireless network, and in all or any subset of the sectors and carriers of a given wireless network as well.

Among other advantages, the invention improves service quality at the expense of capacity in situations where capacity is less of a concern, and improves capacity at the expense of service quality in situations where capacity is more of a concern. Furthermore, the invention improves the average RFER of mobile stations on the sector/carrier and, correspondingly, the call quality and overall experience for users. On average, fewer reverse-link drops should occur as a result of implementing the present invention. Note that a disadvantage may be that mobile stations may use up battery power more quickly, as they will likely be using at a higher average reverse-link transmission power than they otherwise would.

In general, it should be noted that the above overview is illustrative and not limiting. Additional and/or different features may be present in some embodiments. And any description of a network providing service according to CDMA is an example: any suitable modes of wireless communication (e.g. protocols) may be used, such as EV-DO, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. And additional entities could be present as well. For example, there could be additional mobile stations in communication with BTS 104; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also or instead be arranged to communicate according to one or more other types (e.g. protocols) mentioned herein and/or any others now known or later developed. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile stations, such as mobile station 102, over an air interface. The communication interface may also or instead be arranged to communicate according to one or more other types (e.g. protocols) mentioned herein and/or any others now known or later developed. The communication interface may also include one or more wired and/or wireless interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

Note that the combination of BTS 104 and BSC 106 may be considered a base station. However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity, without departing from the scope or spirit of the present invention.

MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between mobile stations and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

3. Exemplary Operation

Figure 2:
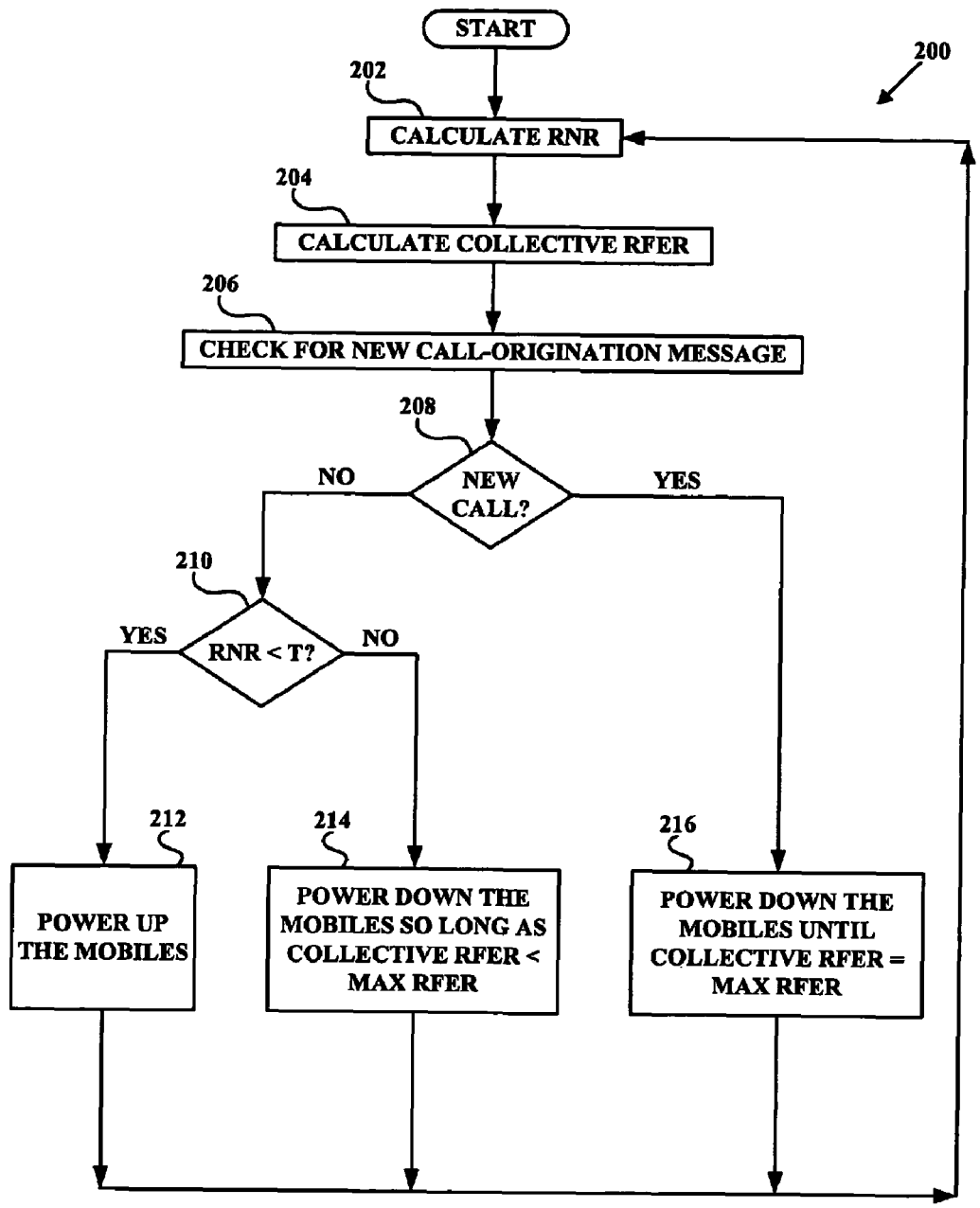
FIG. 2 is a flowchart of a method, in accordance with exemplary embodiments.

FIG. 2 depicts a flowchart of an exemplary method 200, in accordance with an exemplary embodiment. Method 200 is a method of providing service to mobile stations on a carrier in a wireless coverage area, which could be or include one or more cells and/or one or more sectors. In the balance of the description of method 200, a sector will be used as an example wireless coverage area. And the service could be CDMA service, or could be according to another wireless protocol mentioned herein, or any other protocol now known or later developed. Furthermore, although method 200 is described as being carried out by BTS 104, this is not required. In some embodiments, method 200 may be carried out by BSC 106, or perhaps by a combination of BTS 104 and BSC 106. In general, method 300 could be carried out by any one or any combination of network elements described herein, or any other network element(s).

As shown in FIG. 2, method 200 begins at step 202, when BTS 104 periodically calculates an RNR on a sector/carrier. BTS 104 may calculate an RNR once every frame, or according to any other period. As described above, step 202 may involve measuring a current level of noise on the reverse link of the sector/carrier, and then calculating the RNR value as the difference between that current level of noise on the reverse link and a baseline level of noise on the reverse link. As also explained above, this baseline level could correspond to a minimum amount of reverse noise measured in the previous 24 hours, an average of 24-hour-minimum levels of reverse noise over a previous 7-day period, an amount of noise present when the wireless coverage area is unloaded, or some other value. And other possibilities exist as well.

At step 204, BTS periodically calculates a collective RFER for the mobile stations operating on the sector/carrier. Step 204 may be carried out according to the same period as step 202, or according to some other period. As stated above, BTS 104 may repeatedly calculate a collective RFER for comparison with a maximum-RFER value when repeatedly sending power-down commands to the mobile stations on the sector/carrier. In one embodiment, calculating the collective RFER for the mobile stations may involve (a) calculating an individual RFER for each mobile station and (b) calculating the collective RFER as the average of the individual RFERs. In other embodiments, calculating the collective RFER for the mobile stations may involve calculating the collective RFER as the ratio of (a) error-containing and missing (or perhaps just error-containing) frames during a time period on a sector/carrier-wide basis to (b) a total number of expected frames during the time period on a sector/carrier-wide basis. And other possibilities exist as well.

At step 206, BTS 104 periodically checks whether a new call-origination message has been received. This step may be carried out according to the same or a different period as one or both of steps 202 and 204. Furthermore, BTS 104 may implement a software and/or hardware-interrupt approach to detecting new call-origination messages.

At step 208, if a new call-origination message has not been received, then (at step 210) BTS 104 checks whether the calculated RNR (from step 202) is less than an RNR threshold, which may be 5.5 dB, among many other possibilities. If (at step 210) the calculated RNR is less than the RNR threshold, then (at step 212) BTS 104 sends one or more power-up commands (e.g. PCBs equal to 1) to each of mobile stations, wherein a power-up command instructs a mobile station to incrementally increase reverse-link transmission power (e.g. by 1 dB). BTS 104 may send any number of power-up commands as part of carrying out step 212.

If, however (at step 210), the calculated RNR is not less than the RNR threshold, then BTS 104 (at step 214) sends one or more power-down commands (e.g. PCBs equal to 0) to each of the mobile stations so long as the collective RFER is less than a maximum RFER (e.g. 3%), wherein a power-down command instructs a mobile station to incrementally decrease reverse-link transmission power (e.g. by 1 dB). BTS 104 may send any number of power-down commands as part of carrying out step 214. The limitation on only letting the collective RFER climb to no higher than the maximum-RFER upper bound ensures that mobile stations will have at least a minimum level of call (e.g. voice) quality.

If BTS 104 determines at step 208 that a new call-origination message has been received, then (at step 216) BTS 104 sends a series (again consisting of any number) of one or more power-down commands (e.g. PCBs equal to 0) to each of the mobile stations until the collective RFER reaches the maximum RFER. This should give the new call-origination message a good chance of successfully being received and processed.

In general then, the approach of method 200 involves using available reverse-link (i.e. RNR) capacity when the overall RNR situation on the sector/carrier is not above a certain threshold, to let mobile stations use higher levels of reverse-link transmission power and thereby experience lower RFERs and fewer drops. The approach further involves instructing the mobile stations on the sector/carrier to power their reverse links down when the RNR on the sector/carrier gets too high. The mobile stations are instructed to power down only so long as the collective RFER remains below an upper bound, so that call quality does not degrade too much. And detection of new call-origination messages are handled by commanding the mobile stations to power down until the collective RFER reaches that upper bound, to give the new call-origination message a good (or perhaps its best) chance of being successful in establishing a call.

Figure 3:
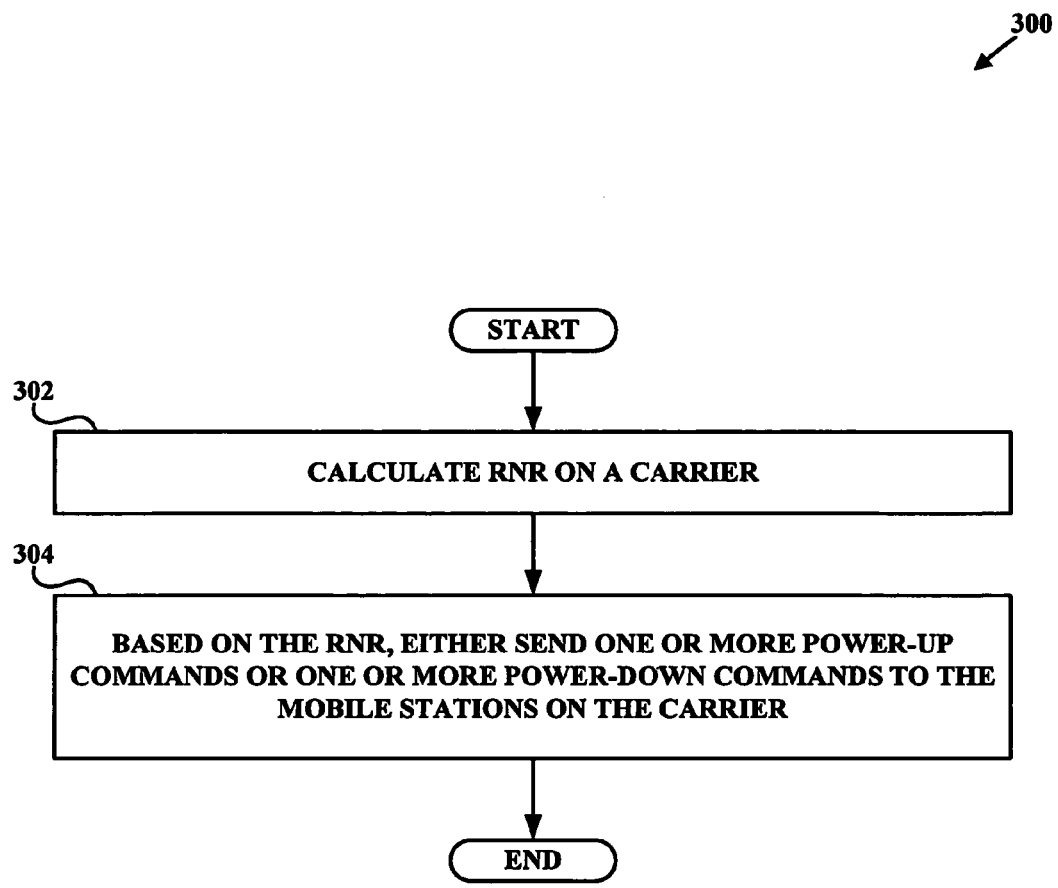
FIG. 3 is a flowchart of a method, in accordance with exemplary embodiments.

FIG. 3 depicts a second exemplary method 300, which may also be carried out by BTS 104 and/or by one or more other network entities. Method 300, like method 200, is a method of providing service to mobile stations on a carrier in a wireless coverage area. Method 300 begins at step 302, when BTS 104 calculates an RNR on the carrier, in the manner described herein or otherwise known in the art. At step 304, based at least in part on the RNR calculated in step 302, BTS 104 either (a) sends one or more power-up commands (e.g. PCBs equal to 1) to each of mobile stations, instructing each of them to incrementally increase reverse-link transmission power (e.g. by 1 dB) or (b) sends one or more power-down commands (e.g. PCBs equal to 0) to each of the mobile stations, instructing each of them to incrementally decrease reverse-link transmission power (e.g. by 1 dB).

4. Conclusion

Various exemplary embodiments have been described above. Those skilled in the art will understand, however, that changes and modifications may be made to those examples without departing from the scope of the claims.

The invention claimed is:

1. A method of providing service to mobile stations on a carrier in a wireless coverage area, the method comprising:
    periodically calculating a reverse noise rise (RNR);
    periodically calculating a collective reverse-link frame error rate (RFER) for the mobile stations;
    periodically checking whether a new call-origination message has been received;
    (a) if a new call-origination message has not been received:
        (i) checking whether the calculated RNR is less than an RNR threshold,
        (ii) if the calculated RNR is less than the RNR threshold, sending one or more power-up commands to each of the mobile stations, wherein a power-up command instructs a mobile station to incrementally increase reverse-link transmission power, and
        (iii) if the calculated RNR is not less than the RNR threshold, sending one or more power-down commands to each of the mobile stations so long as the collective RFER is less than a maximum RFER, wherein a power-down command instructs a mobile station to incrementally decrease reverse-link transmission power; and
    (b) if a new call-origination message has been received, sending a series of one or more power-down commands to each of the mobile stations until the collective RFER reaches the maximum RFER.

2. The method of claim 1, carried out by a base station, wherein the base station comprises at least one of a base transceiver station and a base station controller, and wherein the service comprises code division multiple access (CDMA) service.

3. The method of claim 1, wherein the wireless coverage area comprises at least one of a cell and a sector.

4. The method of claim 1, wherein calculating the RNR comprises:
    measuring a current level of noise on a reverse link; and
    calculating the RNR as the difference between the current level of noise on the reverse link and a baseline level of noise on the reverse link.

5. The method of claim 4, wherein the baseline level of noise on the reverse link corresponds to at least one of a minimum amount of reverse noise measured in the previous 24 hours, an average of 24-hour-minimum levels of reverse noise over a previous 7-day period, and an amount of noise present when the wireless coverage area is unloaded.

6. The method of claim 1, wherein calculating the collective RFER for the mobile stations comprises (a) calculating an individual RFER for each mobile station and (b) calculating the collective RFER as the average of the individual RFERs.

7. The method of claim 1, wherein calculating the collective RFER for the mobile stations comprises calculating the collective RFER as the ratio of (a) error-containing and missing frames during a time period on a sector/carrier-wide basis to (b) a total number of expected frames during the time period on a sector/carrier-wide basis.

8. The method of claim 1, wherein each power-up command comprises a power control bit equal to 1, and wherein each power-down command comprises a power control bit equal to 0.

9. The method of claim 1, wherein the RNR threshold is 5.5 dB.

10. The method of claim 1, wherein the maximum RFER is 3%.

11. A base station for providing service to mobile stations on a carrier in a wireless coverage area, the base station comprising:
    a communication interface;
    a processor; and
    data storage comprising instructions executable by the processor for carrying out functions including:
        periodically calculating a reverse noise rise (RNR);
        periodically calculating a collective reverse-link frame error rate (RFER) for the mobile stations;
        periodically checking whether a new call-origination message has been received;
        (a) if a new call-origination message has not been received:
            (i) checking whether the calculated RNR is less than an RNR threshold,
            (ii) if the calculated RNR is less than the RNR threshold, sending one or more power-up commands to each of the mobile stations, wherein a power-up command instructs a mobile station to incrementally increase reverse-link transmission power, and
            (iii) if the calculated RNR is not less than the RNR threshold, sending one or more power-down commands to each of the mobile stations so long as the collective RFER is less than a maximum RFER, wherein a power-down command instructs a mobile station to incrementally decrease reverse-link transmission power; and
        (b) if a new call-origination message has been received, sending a series of one or more power-down commands to each of the mobile stations until the collective RFER reaches the maximum RFER.

12. The base station of claim 11, wherein the base station comprises at least one of a base transceiver station and a base station controller, and wherein the service comprises code division multiple access (CDMA) service.

13. The base station of claim 11, wherein the wireless coverage area comprises at least one of a cell and a sector.

14. The base station of claim 11, wherein calculating the RNR comprises:
  measuring a current level of noise on a reverse link; and
  calculating the RNR as the difference between the current level of noise on the reverse link and a baseline level of noise on the reverse link.

15. The base station of claim 14, wherein the baseline level of noise on the reverse link corresponds to at least one of a minimum amount of reverse noise measured in the previous 24 hours, an average of 24-hour-minimum levels of reverse noise over a previous 7-day period, and an amount of noise present when the wireless coverage area is unloaded.

16. The base station of claim 11, wherein calculating the collective RFER for the mobile stations comprises (a) calculating an individual RFER for each mobile station and (b) calculating the collective RFER as the average of the individual RFERs.

17. The base station of claim 11, wherein calculating the collective RFER for the mobile stations comprises calculating the collective RFER as the ratio of (a) error-containing and missing frames during a time period on a sector/carrier-wide basis to (b) a total number of expected frames during the time period on a sector/carrier-wide basis.

18. The base station of claim 11, wherein each power-up command comprises a power control bit equal to 1, and wherein each power-down command comprises a power control bit equal to 0.

19. The base station of claim 11, wherein the RNR threshold is 5.5 dB.

20. The base station of claim 11, wherein the maximum RFER is 3%.

* * * * *